United States Patent

Imai et al.

[11] 4,019,595
[45] Apr. 26, 1977

[54] RADIATOR APPARATUS IN A MOTORIZED TWO-WHEELED VEHICLE

[75] Inventors: Masahiro Imai, Tokyo; Satoshi Ishikawa, Kamifukuoka, both of Japan

[73] Assignee: Honda Giken Kogyo Kabushiki Kaisha, Tokyo, Japan

[22] Filed: Aug. 29, 1975

[21] Appl. No.: 609,058

[30] Foreign Application Priority Data

Sept. 4, 1974 Japan .................. 49-105600[U]

[52] U.S. Cl. ............................................. 180/33 R
[51] Int. Cl.² .................. B62D 63/04; B62D 61/02
[58] Field of Search ............. 180/33 R, 33 A, 30, 180/35; 165/41, 44

[56] References Cited

UNITED STATES PATENTS

| | | | |
|---|---|---|---|
| 1,791,483 | 2/1931 | Dalgleish | 165/44 |
| 2,071,761 | 2/1937 | Nicholson | 180/33 R |
| 2,756,832 | 7/1956 | Dalrymple | 180/33 R |
| 2,781,859 | 2/1957 | Warren | 180/33 R |
| 2,783,978 | 3/1957 | Baumgarten | 165/44 |
| 2,962,107 | 11/1960 | Mihal et al. | 180/68 R |
| 3,926,274 | 12/1975 | Morioka | 180/35 |

FOREIGN PATENTS OR APPLICATIONS

| | | | |
|---|---|---|---|
| 1,043,641 | 11/1953 | France | 180/33 R |
| 1,077,820 | 11/1954 | France | 165/44 |
| 950,111 | 10/1956 | Germany | 180/33 R |
| 1,002,645 | 2/1957 | Germany | 180/35 |
| 510,550 | 10/1953 | Italy | 180/33 R |
| 412,839 | 2/1946 | Italy | 180/30 |
| 138,714 | 2/1920 | United Kingdom | 180/30 |

*Primary Examiner*—Robert R. Song
*Assistant Examiner*—Jack D. Rubenstein

[57] ABSTRACT

A radiator apparatus in a motorized two-wheeled vehicle in which a radiator for cooling an internal combustion engine is mounted between left and right tubular elements of the vehicle body. Left and right air guide plates are mounted on the radiator and project obliquely forwards at both outside edges of the radiator to cover the front surfaces of the tubular elements to direct air to the radiator while preventing turbulence at the tubular elements.

2 Claims, 3 Drawing Figures

RADIATOR APPARATUS IN A MOTORIZED TWO-WHEELED VEHICLE

FIELD OF THE INVENTION

This invention relates to radiator apparatus in a motorized two-wheeled vehicle of the type in which a water-cooled type internal combustion engine is mounted thereon.

BACKGROUND OF THE INVENTION

Such apparatus is known for a motorized two-wheeled vehicle of the type having a water-cooled internal combustion engine mounted thereon in which a radiator for cooling the engine is mounted between left and right tubular frame elements of the vehicle body. This conventional arrangement, however, is deficient in that not only will air flow produced by vehicle travel not be fully directed to the radiator because of the existence of the front wheel, front fork and other members in front of the radiator, but also, because the air flow supplied to the radiator is turbulent, the radiator itself serves as a resistance thereto and the air flow is forced to flow right and left whereby the rate of air flow to the radiator becomes insufficient, and thus the cooling efficiency thereof is lowered.

SUMMARY OF THE INVENTION

An object of the invention is to provide an apparatus free from the foregoing deficiency.

According to the invention, in a motorized two-wheeled vehicle of the type in which a radiator for cooling an internal combustion engine is mounted between left and right tubular elements of the vehicle body, the improvement comprises left and right air guide plates projecting obliquely forwards from both outside edges of the radiator to cover the front surfaces of tubular elements.

DETAILED DESCRIPTION

Figure 1:
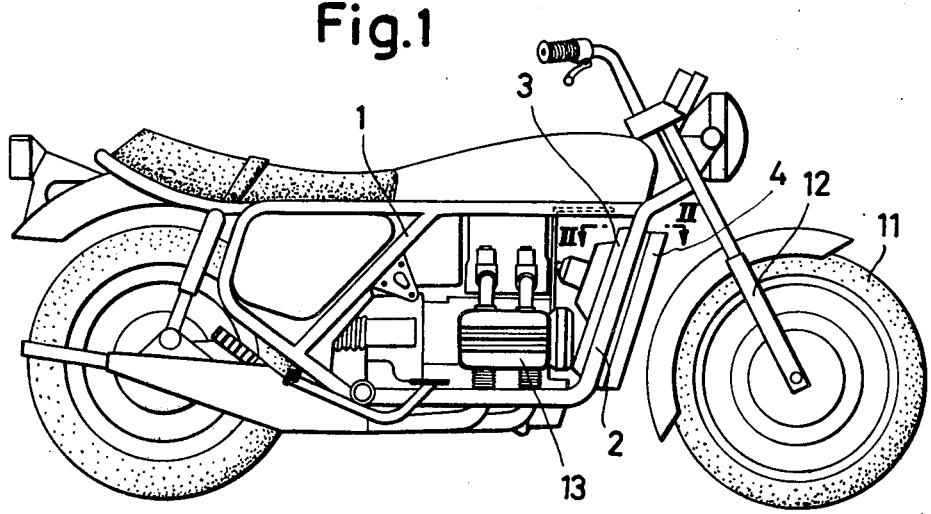
FIG. 1 is a side elevation view of a motorcycle provided with one embodiment of apparatus according to this invention.
Figure 2:
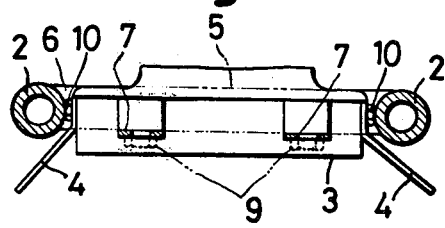
FIG. 2 is a sectional view taken along line II—II in FIG. 1
Figure 3:
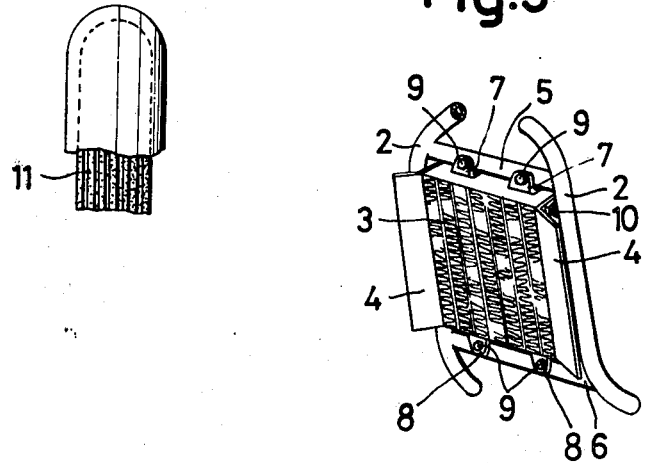
FIG. 3 is a perspective view of a portion of the apparatus.

Referring to the drawing, therein is seen a motorized two-wheel vehicle having a body 1 with left and right tubular frame elements 2 at the front thereof and a radiator 3 mounted between the tubular elements 2 for cooling an internal combustion engine 13 of water-cooled type mounted on the body behind the radiator.

The construction according to the invention is characterized in that left and right air guide plates 4 project obliquely forwards from both outside edges of the radiator 3 to cover the surfaces of the tubular elements 2. The guide plates 4 are coextensive in height with the radiator 3. Numerals 5, 6 denote upper and lower cross pipes of the body extending between the tubular elements 2. The radiator 3 is supported between the tubular elements 2 such that flanges 7 and 8 projecting respectively from the upper and lower portions of the radiator 3 are connected to cross pipes 5,6 by means of respective bolts 9. The air guide plates 4, are connected at their inner end portions to respective side surfaces of the radiator 3 by means of respective bolts 10. Numeral 11 denotes a front wheel, numeral 12 a front fork, all other elements of the vehicle not being described as they are entirely conventional and are not pertinent to the invention.

By virtue of the described construction, when the motorized two-wheeled vehicle is driven, the air flow produced by the vehicle travel becomes turbulent due to the existence of the front wheel 11, the front fork 12 and the other structure at the front of the vehicle, but the air flow is guided by the air guide plates 4 to direct the air to the radiator 3.

Thus, according to this invention, the air guide plates 4 projecting obliquely forwards at both outside edges of the radiator 3 cover the front surface of the tubular elements 2, so that the air flow produced by vehicle travel is effectively guided and concentrated to flow to the radiator 3. Thereby the air flow can be prevented from becoming turbulent due to the action of the tubular elements 2, and thus the heat exchange efficiency of the radiator 3 is extremely improved. Accordingly the radiator 3 can be made small in size and weight.

What is claimed is:

1. A motorized two-wheel vehicle comprising a vehicle body with spaced left and right front frame elements, upper and lower cross pipes between said frame elements defining a rectangular aperture, a radiator mounted in said aperture between said frame elements and said cross pipes, said radiator having upper and lower surfaces and side surfaces, left and right air guide plates mounted on the side surfaces of said radiator and being coextensive in height therewith, said guide plates projecting obliquely forwardly and outwards said radiator to cover the left and right front frame elements at the front surfaces thereof to direct air flow to said radiator while preventing generation of turbulence at said frame elements, and means on the upper and lower surfaces of said radiator directly securing said radiator to said cross pipes.

2. The improvement as claimed in claim 1 wherein said frame elements are tubular.